United States Patent [19]

Lamiraux

[11] Patent Number: 4,959,655

[45] Date of Patent: Sep. 25, 1990

[54] METHOD FOR THE RADIOLOCATION OF A VEHICLE CARRYING A RECEIVING DEVICE, BY MEASURING THE DIFFERENCES BETWEEN THE TIMES FOR RECEIVING RADIO-FREQUENCY SIGNALS, AND RECEIVING DEVICE FOR CARRYING OUT THIS METHOD

[75] Inventor: Christian J. Lamiraux, Sebastien Sur Loire, France

[73] Assignee: MLR Electronique, Vallet, France

[21] Appl. No.: 215,819

[22] Filed: Jul. 6, 1988

[30] Foreign Application Priority Data

Jul. 6, 1987 [FR] France ................................ 87 09556

[51] Int. Cl.[5] .......................... G01S 1/24; G01C 21/00
[52] U.S. Cl. ..................................... 342/389; 364/452
[58] Field of Search .............................. 342/387–391; 364/452; 375/94

[56] References Cited

U.S. PATENT DOCUMENTS

| | | | |
|---|---|---|---|
| 3,493,970 | 2/1970 | Knauth | 342/389 |
| 3,701,018 | 10/1972 | Groth, Jr. | 342/389 |
| 3,947,849 | 3/1976 | Fehlner et al. | 364/452 |
| 4,670,759 | 6/1987 | Fukuhara | 342/389 |

OTHER PUBLICATIONS

The ONI-7000 Airborne Loran-C System (Marchal et al.) IEE, 1982 Position Location and Navigation Symposium pp. 333–338.

In the Rho-Rho Mode (Marchal et al.) Under Sea Technology vol. 12, Apr. 1971 No. 4 pp. 16–19.

*Primary Examiner*—Gregory C. Issing
*Attorney, Agent, or Firm*—Kenyon & Kenyon

[57] ABSTRACT

A method and a device for the radiolocation of a vehicle carrying said device, wherein the radiolocation is performed by measuring the differences between the times for receiving radiofrequency signals transmitted by two transmitting stations geographically far away from each other, of at least one group of stations, each group comprising at least two transmitting stations including one master transmitter-forming station and at least one slave transmitter-forming station controlled by the master transmitter, each station transmitting a series of close electric pulses which are time-shifted in a predetermined way with respect to the series of pulses transmitted by the other stations, during a predetermined period of time, the method being characterized in that the acquisition of the signals and the measurement of the difference between the times for receiving the signals transmitted by transmitting stations of two different groups are performed in a unique receiving channel by performing the acquisitions and measurements of the signals transmitted by stations of one group during the predetermined period of time specific of this group and by performing the said acquisition and measurement of the signals of the transmitting stations of the second group during the interval of time which has been left available by the acquisition and measurement of the signals from the first group, during the period specific of this first group.

7 Claims, 7 Drawing Sheets

METHOD FOR THE RADIOLOCATION OF A VEHICLE CARRYING A RECEIVING DEVICE, BY MEASURING THE DIFFERENCES BETWEEN THE TIMES FOR RECEIVING RADIO-FREQUENCY SIGNALS, AND RECEIVING DEVICE FOR CARRYING OUT THIS METHOD

BACKGROUND OF THE INVENTION

The invention concerns a method for the radiolocation of a vehicle carrying a receiving device, by measuring the differences between the times for receiving radiofrequency signals transmitted by two transmitting stations geographically far away from each other, of at least one group of stations, each group comprising at least two transmitting stations including one master transmitter-forming station and at least one slave transmitter-forming station controlled by the master transmitter, each station transmitting a series of close electric pulses which are time-shifted in a predetermined way with respect to the series of pulses transmitted by the other stations, during a predetermined period of time, and a receiving device for carrying out this method.

One group of transmitting stations of the said type can form a LORAN C-type chain. Such chains are installed along the coast and are characterized by their period called GRI. In order to improve the precision of the radiolocation in the limiting zones located at the junction between two chains, it is interesting to be able to obtain the coordinates of the position of the vehicle by exploiting simultaneously the signals from two pairs of stations each belonging to one of the two chains. Until now, it has been known to use for this purpose two receiving channels, of which being tuned to one pair of stations. Now, a receiving device of such a design has a very complex structure and is very costly.

SUMMARY OF THE INVENTION

The present invention has as an object to meet the drawbacks of the known receiving devices.

In order to attain this object, the method of radiolocation according to the invention is characterized in that the acquisition of the signals and the measurement of the difference between the times for receiving the signals transmitted by transmitting stations of two different groups are performed in a unique receiving channel by performing the said acquisitions and measurements of the signals transmitted by stations of one group during the predetermined period of time specific of this group and by performing the said acquisitions and measurements of the signals of the transmitting stations of the second group during the interval of time which has been left available by the acquisitions and measurements of the signals from the first group, during the period specific of this first group.

According to an advantageous feature of the invention, before each phase of acquisition and of measurement of the signals from the second group, a checking is performed to know whether a phase of acquisition and of measurement of the signals from the first group is occurring or will occur after a predetermined time before this phase and, if so, the acquistion and the measurement of the signals from the second group are inhibited.

The receiving device for carrying out the method according to the invention is characterized by a unique receiving channel comprising a device for sampling the received signals, a programmable counter for controlling the sampler and an arithmetic unit programmed to simultaneously count the presumed positions of the signals to be measured from the two groups of transmitting stations, and to control the programmable counter.

BRIEF DESCRIPTION OF THE DRAWINGS

The invention will be better understood, and other objects, features, details and advantages thereof will appear more clearly as the following explanatory description proceeds with reference to the figures given by way of example only and illustrating an embodiment of the invention.

DETAILED DESCRIPTION

There will be disclosed below the method and the transmitting device according to this invention when applied to a system comprising LORAN C chains. A LORAN C chain is a group of two to six transmitting stations containing one master transmitter-forming station and slave transmitter-forming stations controlled by the master transmitter. The latter transmits a series of eight pulses during a period comprised between 49 and 100 milliseconds which characterizes the chain. This period of transmission is for example a multiple of 100 microseconds. The interval between two front edges of transmitted pulses is equal to one millisecond. Each of the slave transmitters of the chain transmits during the characterizing period of the chain, a group of eight close pulses having a determined delay with respect to the series of pulses transmitted by the master transmitter, which permits a receiving device to identify each slave by its coarse position in the period. The eight pulses transmitted by the master have a phase code which permits identifying the master among all the slaves which have a common phase code, different from the master's. The periods of repetition are divided into two groups A and B forming a sequence of transmission whose duration is equal to two periods of repetition, each group being recognizable by different phase codes set for the master and for the slaves. Therefore, all of the recognizable sequences of transmission are multiples of 200 microseconds.

Besides, the masters driven by clocks with a high stability are synchronous with the universal time with a stated accuracy of plus/minus 5 microseconds.

The receiving device according to the present invention is designed as well for performing the measurement of the differences between the times for receiving two signals transmitted by two master stations as for performing the measurement of the differences between the times for receiving signals coming from two slave stations of different chains, the delays of the slaves being known. The accuracy of the measurement is the accuracy defined by the accuracy of synchronization of the master transmitters with the universal time and the largest measurable time of the measurement, named "modulo", which forms the highest common factor of the two sequences of transmission, is of at least 200 microseconds. Due to the high stability of the master oscillators of the master stations, the inaccuracy of plus/minus 5 microseconds can be balanced for periodically by calibrating of the receiver at a known fixed point. For example, the instability defined at $2 \times 10^{-13}$ km/usec for the transmitting stations permits limiting the position drift at 10 meters for each period of 24 hours. Once calibrated, the ability of the receiver to produce a "modulo" measurement of 200 microseconds requires only a reckoning of 30 kilometers.

Among the interesting applications of the invention, there is the radionavigation on aircraft and generally on all the moving bodies starting from a known geographical position for a time-limited journey: 5 days for a possible drifting of 50 meters.

Figure 1:
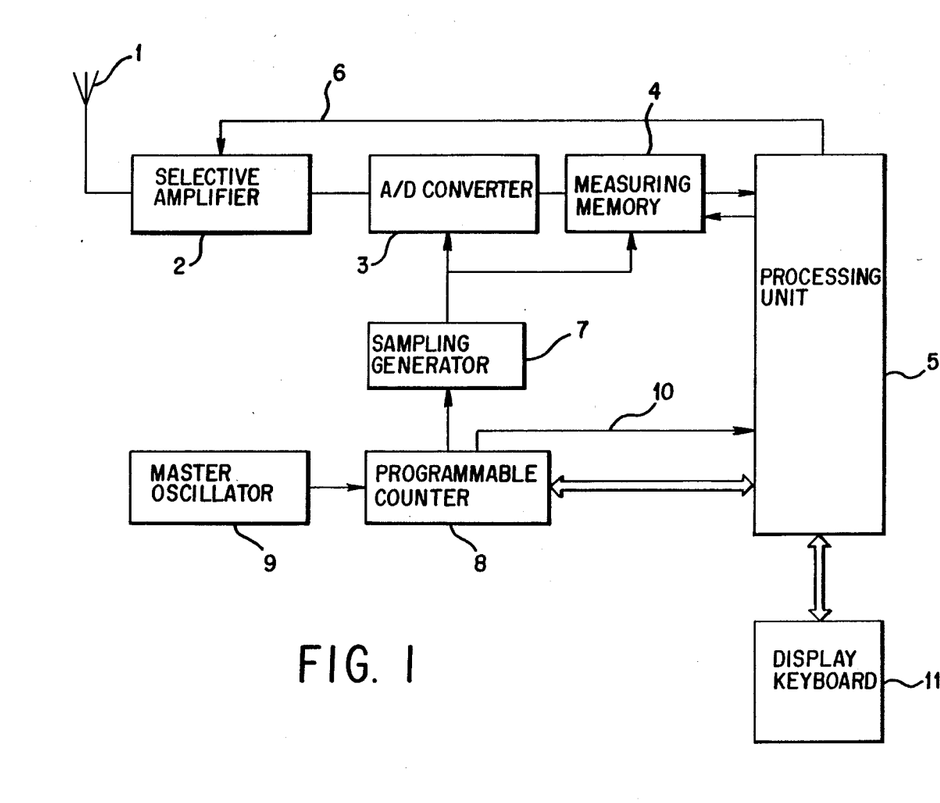
FIG. 1 shows the receiving device according to the invention in the shape of a schematic block-diagram.

A receiving device according to the invention such as shown in FIG. 1 by way of example comprises a unique receiving channel which includes, mounted in series, one antenna 1, one selective amplifier 2 centered on the frequency of the 100 kilohertz LORAN C signals, one analog-to-digital converter 3, one measuring memory 4 and one arithmetic unit 5 capable of dialogues with the measuring memory 4. The gain of the amplifier is adjustable, for example with four steps of 12 decibels, by the arithmetic unit, through the medium of a wire conductor 6, so as to bring to the converter 3 a signal whose level is adapted to the input dynamics.

The channel comprises also a sampling generator which supplies the converter 3 with a sampling signal formed of 16 successive pulses spaced by 2.5 microseconds, so as to perform the measurement of a LORAN signal over a duration of four alternations which permits identifying the rising edge of each LORAN pulse according to a well known sampling method. The generator 7 is connected also to the measuring memory 4. Generator 7 produces its sampling signals under the control of a programmable counter 8, which sets an order for controlling the sampling according to a cycle which can be adjusted by the arithmetic unit 5 between one millisecond and two milliseconds with steps of 0.1 microsecond. The programmable counter 8 to which a master oscillator 9 is associated transmits to the arithmetic unit 5, through the medium of a wire conductor 10, the information of end of cycle in order that unit 5 performs the time counting and samples measurement data memorized in the measuring memory 4 which forms the buffer memory of converter 3, under the effect of sampling generator 7. It is seen also that a keyboard and display device 11 is associated with the arithmetic unit 5. The keyboard permits the user to determine the LORAN C chains which are to be tracked by the inscription of the period or periods of repetition and of the transmitters defined by their rounded times of delay during their period. The keyboard permits also introducing a reckoning geographical position which is used for setting the expected time differences according to a known computing program. The display provides mainly the information of geographical position, the measured time differences, the levels of reception of each of the signals and the signal loss emergency information.

The operation of the receiving device according to the invention will be described hereafter, which device has just been described in its use for the simultaneous tracking of two periods respectively of 79.7 milliseconds and of 89.4 milliseconds, which are specific of the chains of Norway and of France. Hereafter, the two periods will be called GRI 1 and 2 (Group Repetition Interval).

For the first period (GRI 1), considered as having priority in the example, the arithmetic unit programs the counter on 1 millisecond. After 78 readings of end of cycle, received through the medium of wire conductor 10, the arithmetic unit 5 programs the counter on 1.7 millisecond. When the unit reads the end of this cycle of 1.7 millisecond, the counter is reprogrammed on the cycles of 1 millisecond. The described sequence permits defining the period of 79.7 millisecond.

This period produced locally in the receiver and corresponding to the period of the first LORAN C group or chain is used as a reference for the measurement of the differences of time of program count of the radioelectric signals coming from two transmitting stations of this chain which can be the master transmitter and a slave transmitter, as in the example which will be described hereafter, or two slave transmitters. In order that the local sequence or period can be used as a reference, it is caused to slide in the time of the period of 79.7 milliseconds of the chain, so as to put the reception of the master at the beginning of the sequence, the program count of the programmable counter on the cycle of 1.7 millisecond being replaced periodically by 1.8 millisecond until the desired coincidence to within 100 microseconds is obtained. In order to know whether there is a coincidence or not, the programmable counter 8 releases, at the end of the cycle of 1.8 millisecond, the sampling device 7 which supplies the signal formed of 16 successive pulses spaced by 2.5 microseconds as described above, to identify the rising edge of each pulse of the received master signal. Then, an identical action is performed on the low position values of the counter which presents a step of 0.1 microseconds, to complete the synchronization of the master.

For the acquisition of the signals coming from the slave transmitter of the same GRI 1, the arithmetic unit is programmed to perform the process of loading the following programmable counter 8. Assuming that the front edge of the first of the eight pulses of the slave signal is expected at the position corresponding to the interval of 14.3 milliseconds counted from the master signal in the sequence of GR 1, the arithmetic unit loads the programmable counter 8 at the position 13 of the sequence in order that it performs a cycle of 1.3 millisecond. At the end of this cycle, as stated by counting down to 0, the counter 8 orders the sampling device 7 to transmit the sampling signal of 16 pulses to converter 3 and the arithmetic unit loads the counter 8 at one millisecond for eight times corresponding to the eight pulses of the slave series. Then, the arithmetic unit 5 loads the counter in order that it performs a cycle of 1.7 millisecond, 1.7 being the complementary number of the front loading shifting of 1.3 millisecond. This measurement permits coming back in the sequence of GRI 1 at positions of integer to keep the total sequence of 79.7 milliseconds which is counted in the abovementioned way. Indeed, after the cycle of 1.7 millisecond, the counter has once more to perform cycles of 1 millisecond up the position 78 where it will be caused to perform a cycle of 1.7 millisecond. If the presumed position of reception of the slave signal, i.e. of the series of pulses is in advance or late by the instant of time of the actual reception of the signal, during the following sequences the arithmetic unit tries presumed positions which are shifted accordingly until there is a coincidence between the received signal and the presumed position of reception in the sequence of 79.7 milliseconds produced in the receiver.

The acquisition of the signals coming from the second chain having a period of 89.4 milliseconds occurs in the spaces which have been left available by the acquisition of the signals transmitted by the two stations of the first group, during the period of 79.7 milliseconds of this group. This operation will be described later. For the acquisition and the measurement of the signals of the second group, the arithmetic unit 5 is programmed to count, at each beginning of the sequence of the first group, i.e. at the moment of the reception of the front edge of the first pulse of the series of master pulses, the delay of the reception of the signal coming from the master of the second group, the difference between the periods of the two GRI being of 9.70 milliseconds (89.4–79.7), and determines by counting the presumed location of the master of the second group in the local sequence reproduced in the receiver, and that of the slave signal of GRI 2.

The fine tuning on the two stations of the second chain or of the second group is performed in the way disclosed concerning the slave of the first group, by programming the counter in the space at two milliseconds which preceeds the presumed position of the first pulse of the series of eight pulses at the appropriate cycle, then by setting the programmable counter 8 at one millisecond to measure the eight pulses to be treated and by setting back the counter at the number of the complement to come back to an entire position in the sequence of GRI 1.

However, the order of acquisition and of measurement is released only when the counter 8 is not occupied by the tracking of the signals coming from the first chain. For this purpose, the arithmetic unit is programmed according to a software for releasing a sequence of eight pulses on the signals of the second chain, which is valid for the two stations to be tracked of this second chain. According to this software, at the pip of internal counting of the arithmetic unit which determines the moment of addressing of the programmable counter 8 for the first eight pulses of the master of the second chain for example, a checking is performed to know if a station of the first chain is being sampled. If this is the case, there is no addressing of the counter for a sampling on the signal of the master. If there is no sampling on a station of the first chain, a checking is further performed to know if the time before the arrival of the signal of the next station to take into account of the first chain is longer than a predetermined duration, for example of 9 milliseconds. If the answer is negative, there is no addressing of the counter for a sampling on the signal of the master of the second chain. On the contrary, if the time is longer than the predetermined duration, the arithmetic unit addresses the programmable counter 8 for a sampling on the master of the second chain. The same checking process occurs for a sampling on a slave signal belonging to the second GRI, i.e. coming from the second chain.

Concerning the time available for the sampling on the signals of GRI 2, it is seen that the time of non-employment of the receiver according to the invention is equal to 79.7−18=61.7 milliseconds, i.e. 77% of a total time, the 18 milliseconds representing the total duration of the two series of 8 pulses of the master and of the slave of the first chain. Therefore, it is during this time of 61.7 milliseconds that the samplings on the GRI 2 could be performed if permitted by the GRI 1. Due to the predetermined safety time of 9 milliseconds upstream of a sampling on a signal of GRI, the actually available time for the GRI 2 averages 61.7−18=43.7 milliseconds, i.e. in this example 55% of the total time and in the general case, about 50%, which is satisfactory to ensure the quality of treatment of the signal, the effect of a one-of-two (50%) multiplexing giving rise to a degradation of the signal ratio of 3 db which is low enough to be neglected with respect to the other effects of inaccuracy.

Concerning the measurement of the difference of time for example between two master signals of the two LORAN C groups or chains, this measurement is performed by retaining the expected value of the delay of the second master signal at the moment of addressing of the programmable counter 8 for the purpose of the sampling on the first pulse of the series of pulses of the master signal. The sampling occurs during the change from the period B towards the period A of the first group and takes into account the state of the period A or B of the second chain, by adding the value of the period of GRI 2, i.e. of the second chain, if the state is B. The successive periods A and B of a total sequence of each chain are identified by comprising the phase codes of the groups of eight pulses with the model code set for the two periods A and B. For each read value, the remainder of the division by 200 milliseconds is carried, which represent a stable data depending on the position of the receiver.

Figure 2A:
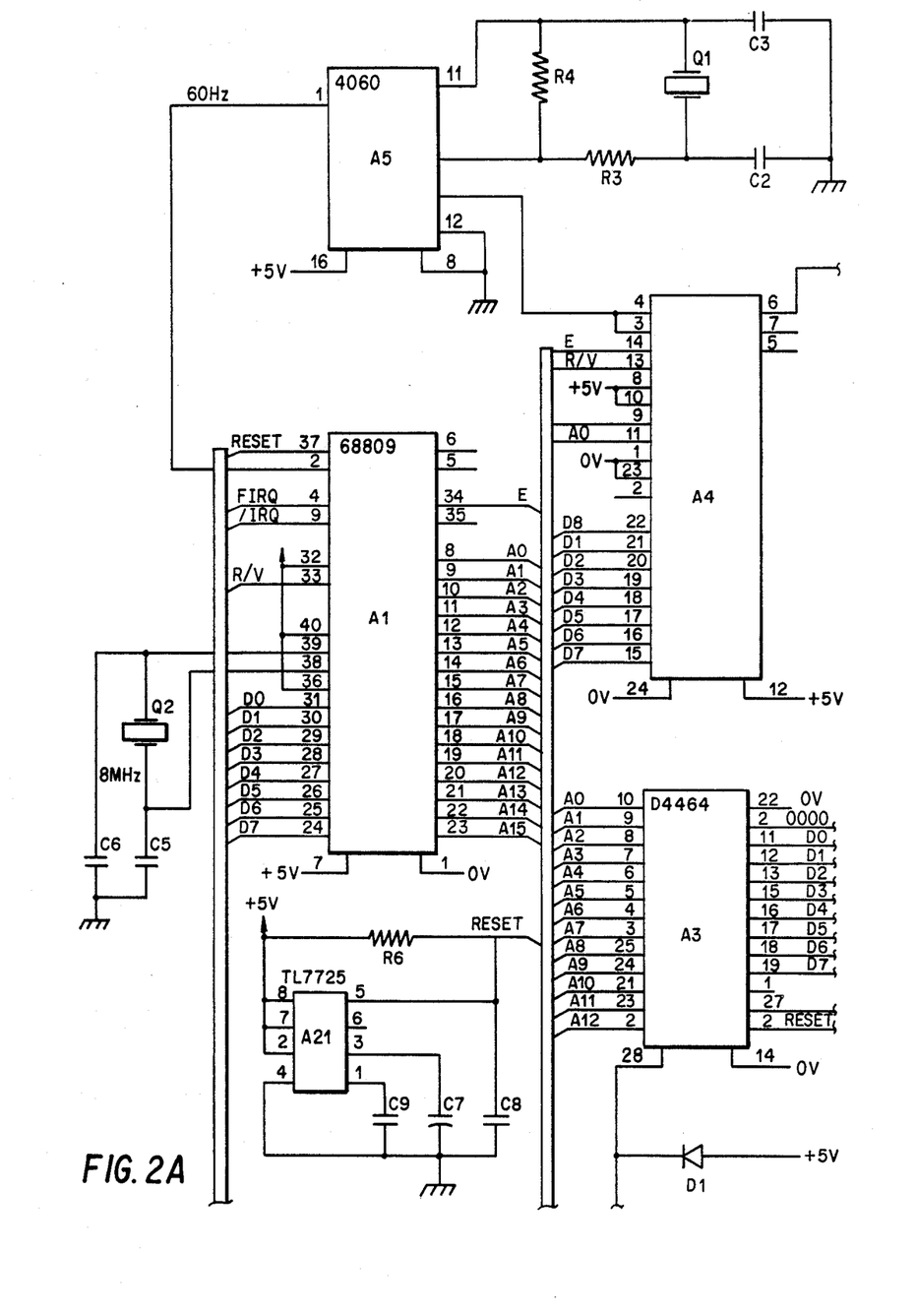
FIGS. 2 and 3 show a concrete wiring diagram of this receiving device.
Figure 2B:
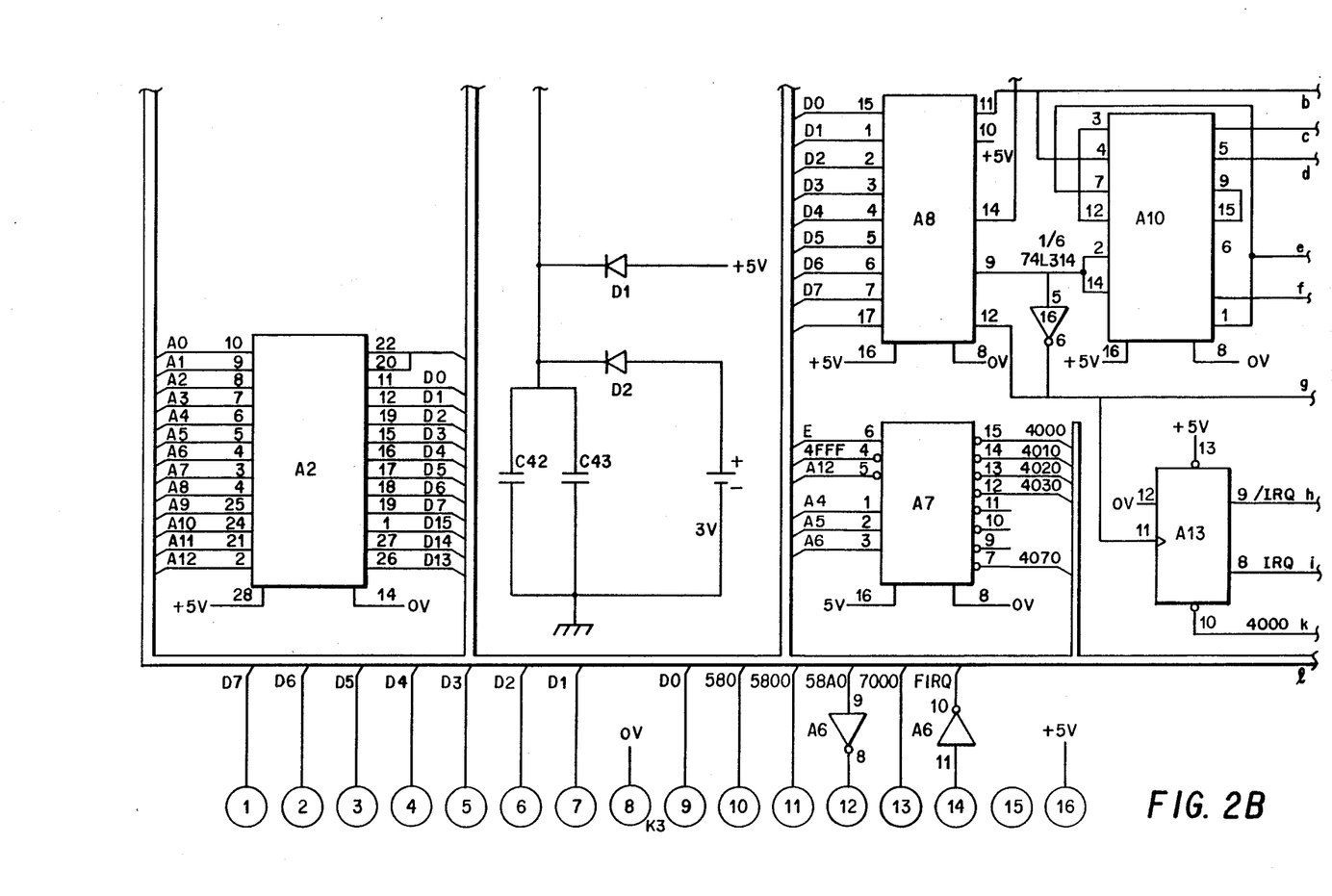
Figure 2C:
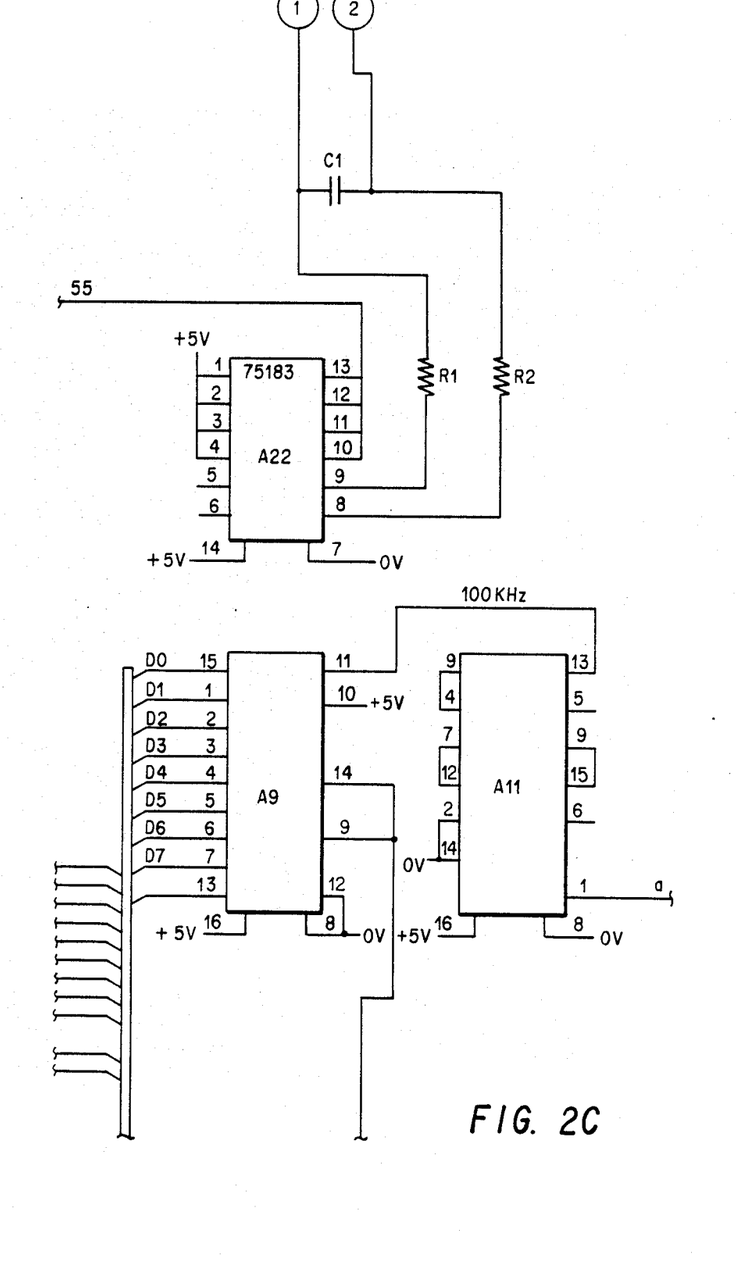
Figure 3A:
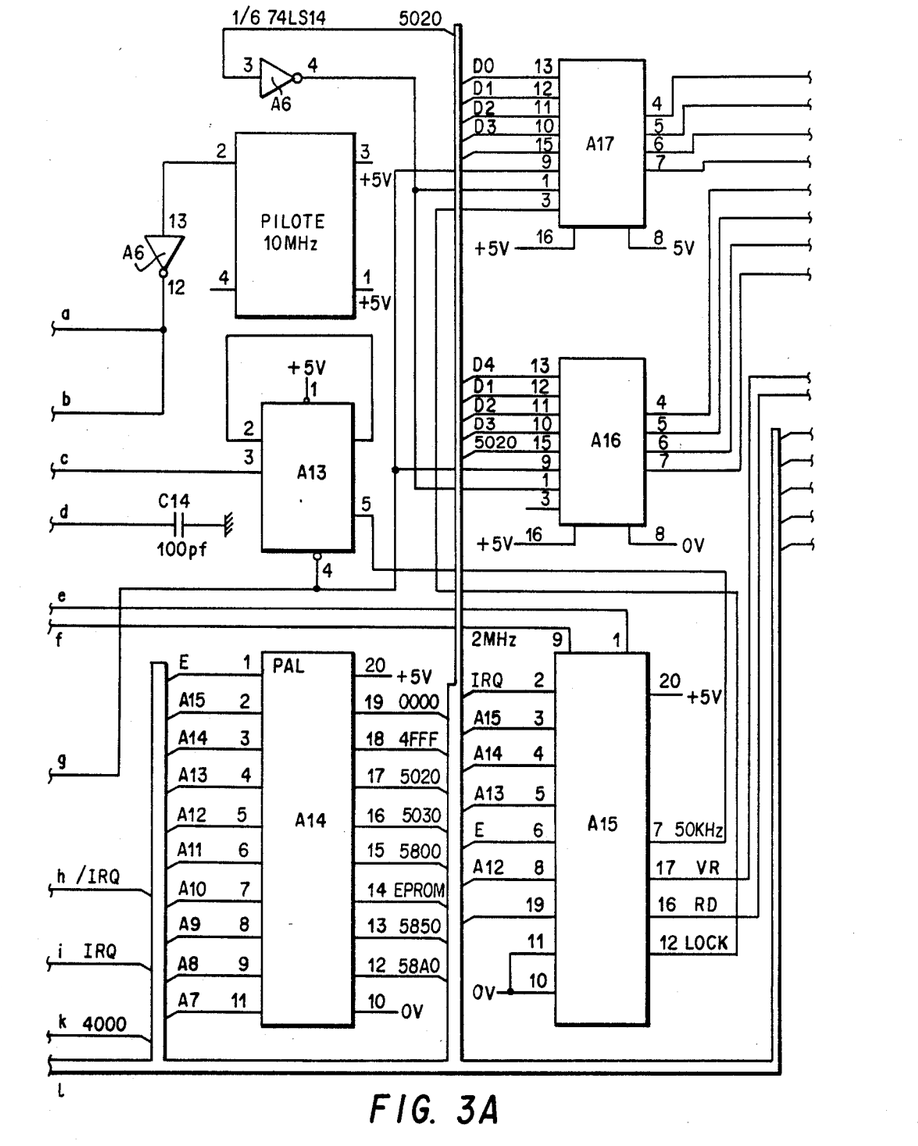
Figure 3B:
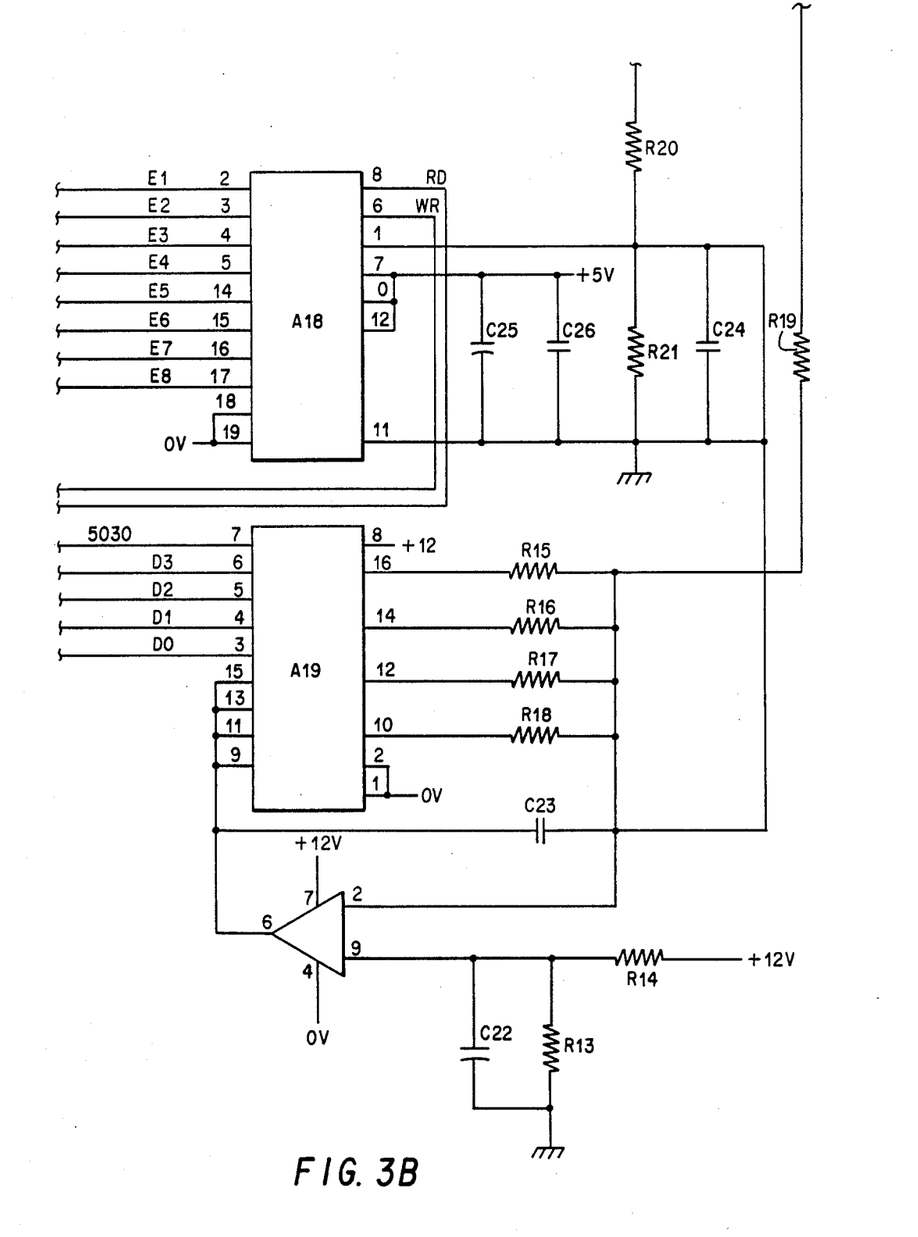
Figure 3C:
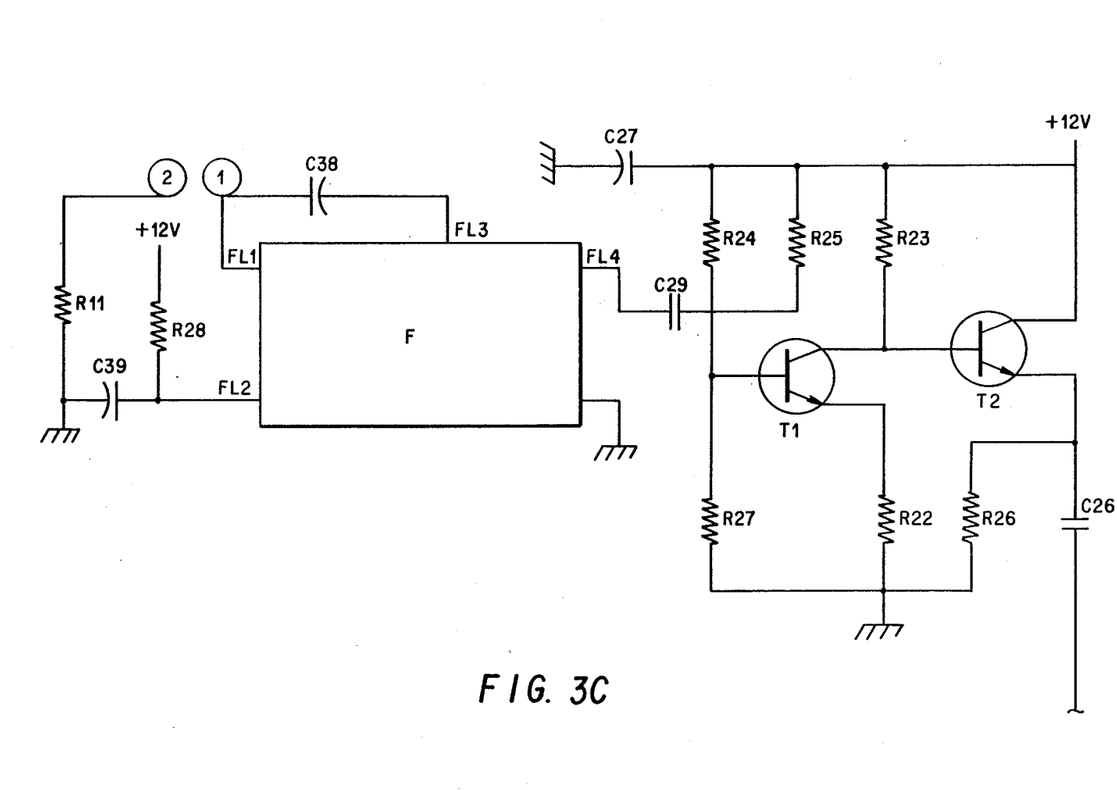

Referring to FIGS. 2 and 3, a preferred embodiment of the device for concretely carrying out the method which has just been described with reference to the schematic diagram of FIG. 1 will now be briefly described. FIGS. 2 and 3 show this device in two parts, the electric connection between the two parts being performed by conductors which are designated in FIGS. 2 and 3 by the same reference signs, namely by letters a to l.

In this diagram, the arithmetic unit 5 of FIG. 1 is essentially formed of conventional assemblies constituting the connection of a microprocessor. In this connection, A1, A2 and A3 form respectively the microprocessor, the programme storage and the read-write memory. A4 is an interface circuit in series whereas A7 and A14 form the address decoding circuit. Circuit A21 provides the original signal (RS) which follows the switching on of the circuit. Reference sign K3 designates the connector which forms the interface of the keyboard and display circuit 11 of FIG. 1. This connection of the microprocessor is of course completed by other associated conventional circuits, such as circuits with quartz oscilators.

In this diagram shown in FIGS. 2 and 3, the antenna signal is received by connector K2. It is applied to a filter F with eight cells of the LC type, tuned in order that the LORAN C signal can pass. Transistors T1, T2 perform an amplicication. The signal arrives then at amplifier A20 which transmits the signal to the converter of circuit A12 forming the analog-to-digital converter 3 of FIG. 1. The gain of amplifier A20 is adjusted by the switch connection of circuit A19 which determines the value of the negative feedback-resistor, namely R15, R16, R17 or R18, depending on the state of the control coming from the microprocessor by data D0 to D3, and address 5030. The set of resistors permits modifying the gain of amplifier by steps of 13 decibels. The input circuit up to amplifier 20 materializes the selective amplifier shown at 2 in FIG. 1.

The converter circuit A18 receives conversion orders through inputs RD and WR. As has been described above, sixteen successive orders, spaced by 2.5 us are thus received and the results of the conversions of 8 bits each are disposed in series inside circuits A16 and A17 which are memory registers of the FIFO type. These circuits A16 and A17 correspond to the measuring memory 4 of FIG. 1. The data are then sampled by the microprocessor circuit, through the excitation of address 5020, as shown in the diagram. In this diagram, the circuit forming the master oscillator is designated by 9, as in FIG. 1. This oscillator produces a 10 MHz signal, which is applied to a counter divider-forming circuit A11. This circuit produces a signal of 100 KHz and applies it to the programmable 8 bit counter. This counter 9 is previously loaded with the bus, under the action of address 4010, the buses being shown in broad lines. The output 9 of the counter is excited when the counter reaches its maximal value. The signal applied to terminal 14 has as an effect to reload the counter at the predetermined value in the buffer memory of counter A9. Therefore, the signal of terminal 9 counts integral numbers of periods of 100 KHz, which are defined by the microprocessor. The signal at terminal 9 of counter A9 is applied to a programmable counter circuit A8 which counts an intergral number of periods of the 10 MHz signal, which is predetermined by the microprocessor under the action of address 4030.

The signal present at the output terminal 9 of counter A8 releases counter A10, which is connected to decoding circuit A15, and which produces the sixteen sampling orders for the analog-to-digital converter A18 for filling FIFO memories A16 and A17. The counter A8 is blocked after each counting by the signal of end of counting, applied to the input terminal 12. The signal is also applied to circuit A13 which forms a flip-flop or bistable circuit and produces the interruption signal IRQ. This signal is applied to microprocessor A1. Due to this interruption, the microprocessor performs in particular the programme for sampling the measurements located in the FIFO memory, as has been described in detail above.

It is to be noted that only the circuits of the diagram according to FIGS. 2 and 3, which are the most essential circuits for the understanding of the concrete materialization of the block diagram according to FIG. 1, have been disclosed, the other circuits shown forming conventional accessory circuits, whose presence and structure are obvious for the man skilled in the art.

What is claimed is:

1. A method for the radiolocation of a vehicle carrying a receiving device, by measuring the differences between the times of receiving radiofrequency signals transmitted by two pairs of transmitting stations geographically separated from each other, one pair of transmitting stations from a first group of stations and the second pair of transmitting stations from a second group of stations, each group comprising at least two transmitting stations including one master transmitter station and at least one slave transmitter station which is controlled by the master transmitter, each station of the two pairs of transmitting stations transmitting a series of electric pulses which is time-shifted in a predetermined way with respect to the series of pulses transmitted by the other stations of the two pairs of stations in a way to avoid simultaneous reception of said series of electric pulses coming from different stations, during a predetermined period of time specific for each group, the periods of specific time for each group being different from the ones of the other group, wherein an acquisition of the signals and a measurement of the difference between the times for receiving the signals transmitted by transmitting stations of two different groups are performed in a unique receiving channel by performing the acquisitions and measurements of the signals transmitted by stations of the first group during the predetermined period of time specific for the first group and by performing the acquistions and measurements of the signals of the transmitting stations of the second group during the interval of time which has been left available by the acquisition and the measurement of the signals from the first group, during the period specific for the first group.

2. The method according to claim 1, wherein before each phase of acquisition and of measurement of the signals from the second group, a checking is performed to know whether a phase of acquistion and of measurement of the signal from the first group is occurring or will occur aftr a predetermined time before this phase, and if so, the acquisition and the measurement of the signals from the second group are inhibited.

3. The method according to claim 1, wherein to establish a location of hyperbolic positions between two stations belonging to two different groups with different predetermined periods of time the exploitation of the measurement at a geographic point where the measurement of the phase difference between the signals received from the two stations is different at the most, by one half of a time period which is equal to the highest common factor of the two aforesaid predetermined periods of the transmitting stations.

4. A receiving channel, comprising:
   a sampling pulse generator sampling measurement data on signals to be measured;
   a programmable counter controlling said sample pulse generator; and
   an arithmetic unit adapted to establish, within a specific period of one group of a pair of groups of transmitter stations, each group including at least two transmitter stations including one master transmitter and at least one slave transmitter controlled by the master transmitter, the position of the signals to be measured from the two groups and to control said programmable counter to cause said sampling pulse generator to produce measuring sampling pulses at the instant of each position,
   the programmable counter being designed to perform counting down cycles whose duration is adjustable by the arithmetic unit and to transmit to the latter the information of the end of a cycle,
   and the arithmetic unit being programmed to cause the programmable counter to perform an overall sequence of cycles comprising a number of equal duration cycles, adjusted by said arithmetic unit so that the sequence duration of the overall sequence is identical to the specific period of a first group of transmitting stations, to shift this overall sequence until it is in synchronism with said received specific period, to determine in this overall sequence a presumed position of each said signal to be measured by a number of said equal duration cycles and a position cycle of a different duration, to cause said programmable counter, after the beginning of the sequence, to produce for each presumed position the corresponding number of equal duration cycles and the position cycle of different duration, to make the sampling pulse generator to produce said measuring sampling pulse after the end of said position cycle of different duration and to produce a complementary different duration cycle having a duration so that the sum of this complementary different duration cycle and of the position cycle of different duration is a multiple of an equal duration cycle to enable the programmable counter to continue to produce the cycles of the sequence with position cycles of successively varying duration until there is coincidence between the presumed position and the instant of reception of each signal to be measured.

5. The receiving channel of claim 4, further comprising: a selective input amplifier; and an analog-to-digital converter downstream of said selective input amplifier upon which acts the sampling generator device and which is connected to a measurement storing memory connected to the arithmetic unit.

6. The receiving channel of claim 4, further comprising a display and keyboard device permitting a user to inscribe the periods of the groups of transmitting stations and the slaves defined by their time of delay with respect to their masters.

7. The receiving channel according to claim 4, wherein, for the acquisition and the measurement of the signals from transmitting stations of a second group of stations whose period is different from that of said first group, the arithmetic unit is programmed to determine in the sequence determined for this first group the presumed positions corresponding to the reception of the signals of the second group to be acquired and measured, while taking into account the time-shifting of the signals of the master transmission of the first and second groups, caused by the different time durations of the two periods.

* * * * *